(12) United States Patent
Ravipati et al.

(10) Patent No.: US 9,171,003 B2
(45) Date of Patent: Oct. 27, 2015

(54) SHARED MEDIA CRAWLER DATABASE METHOD AND SYSTEM

(71) Applicant: Western Digital Technologies, Inc., Irvine, CA (US)

(72) Inventors: Satyanarayana Ravipati, San Ramon, CA (US); Anirudha Deglurkar, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 55 days.

(21) Appl. No.: 13/841,789

(22) Filed: Mar. 15, 2013

(65) Prior Publication Data

US 2014/0280010 A1    Sep. 18, 2014

(51) Int. Cl.
*G06F 17/30* (2006.01)

(52) U.S. Cl.
CPC .................... *G06F 17/301* (2013.01)

(58) Field of Classification Search
CPC .......................... G06F 17/30864; G06F 17/301
USPC ......................................................... 707/709
See application file for complete search history.

(56) References Cited

U.S. PATENT DOCUMENTS

| | | | |
|---|---|---|---|
| 6,424,966 B1 * | 7/2002 | Meyerzon et al. | ............ 707/610 |
| 6,466,949 B2 | 10/2002 | Yang et al. | |
| 6,499,054 B1 | 12/2002 | Hesselink et al. | |
| 6,732,158 B1 | 5/2004 | Hesselink et al. | |
| 7,120,692 B2 | 10/2006 | Hesselink et al. | |
| 7,287,133 B2 * | 10/2007 | Rowan et al. | ................. 711/156 |
| 7,454,443 B2 | 11/2008 | Ram et al. | |
| 7,467,187 B2 | 12/2008 | Hesselink et al. | |
| 7,475,406 B2 * | 1/2009 | Banatwala et al. | ........... 719/318 |
| 7,478,128 B2 | 1/2009 | Helmstetter et al. | |
| 7,509,304 B1 | 3/2009 | Pather et al. | |
| 7,546,353 B2 | 6/2009 | Hesselink et al. | |
| 7,587,467 B2 | 9/2009 | Hesselink et al. | |

(Continued)

FOREIGN PATENT DOCUMENTS

KR    10-2006-0134701    12/2006

OTHER PUBLICATIONS

Leung, Andrew, et al., "Spyglass: Fast, Scalable Metadata Search for Large-Scale Storage Systems", FAST '09, San Francisco, CA, Feb. 24-27, 2009, pp. 153-166.*

(Continued)

*Primary Examiner* — Robert Stevens (57) ABSTRACT

The embodiments relate to transcoding, cataloging, and extracting metadata about files stored in a storage device. In one embodiment, a crawler runs on the storage device and maintains a database that is stored in the volume with the data that has been cataloged by the crawler. The crawler may discover files of any type and extract associated metadata about the files. The crawler can extract metadata about client interaction with various files, such as edits, play counts, etc. The crawler may discover files of any type and extract associated metadata about the files automatically during a scan or at the request of a client. In one embodiment, the crawler may be responsive to file system events that indicate changes to the file system, such as additions, deletions, or other types of changes. In addition, the crawler may synchronize the database with the file system so that they indicated the same state for a particular file. Furthermore, the crawler may provide notifications to various entities regarding the state of a file.

21 Claims, 6 Drawing Sheets

(56) References Cited

U.S. PATENT DOCUMENTS

| | | | |
|---|---|---|---|
| 7,600,036 | B2 | 10/2009 | Hesselink et al. |
| 7,698,276 | B2 * | 4/2010 | Seshadri et al. ............... 719/318 |
| 7,788,404 | B2 | 8/2010 | Hesselink et al. |
| 7,793,326 | B2 | 9/2010 | McCoskey et al. |
| 7,890,551 | B2 * | 2/2011 | Benelisha et al. ............ 707/821 |
| 7,917,628 | B2 | 3/2011 | Hesselink et al. |
| 7,934,251 | B2 | 4/2011 | Hesselink et al. |
| 7,949,564 | B1 | 5/2011 | Hughes et al. |
| 8,004,791 | B2 | 8/2011 | Szeremeta et al. |
| 8,131,674 | B2 * | 3/2012 | Arrouye et al. ............... 707/625 |
| 8,255,661 | B2 | 8/2012 | Karr et al. |
| 8,285,682 | B2 | 10/2012 | Oza |
| 8,285,965 | B2 | 10/2012 | Karr et al. |
| 8,341,117 | B2 | 12/2012 | Ram et al. |
| 8,341,275 | B1 | 12/2012 | Hesselink et al. |
| 8,352,567 | B2 | 1/2013 | Hesselink et al. |
| 8,526,798 | B2 | 9/2013 | Hesselink |
| 8,631,284 | B2 | 1/2014 | Stevens |
| 8,646,054 | B1 | 2/2014 | Karr et al. |
| 8,661,507 | B1 | 2/2014 | Hesselink et al. |
| 8,688,797 | B2 | 4/2014 | Hesselink et al. |
| 8,713,265 | B1 | 4/2014 | Rutledge |
| 8,762,682 | B1 | 6/2014 | Stevens |
| 8,780,004 | B1 | 7/2014 | Chin |
| 8,793,374 | B2 | 7/2014 | Hesselink et al. |
| 8,819,443 | B2 | 8/2014 | Lin |
| 8,868,666 | B1 | 10/2014 | Hellwege et al. |
| 2003/0028889 | A1 | 2/2003 | McCoskey et al. |
| 2003/0028896 | A1 | 2/2003 | Swart et al. |
| 2003/0200314 | A1 | 10/2003 | Giffin |
| 2005/0144195 | A1 | 6/2005 | Hesselink et al. |
| 2005/0144200 | A1 | 6/2005 | Hesselink et al. |
| 2008/0021811 | A1 * | 1/2008 | Brader-Araje et al. ......... 705/37 |
| 2008/0040354 | A1 | 2/2008 | Ray et al. |
| 2008/0249961 | A1 * | 10/2008 | Harkness et al. ............. 705/400 |
| 2009/0006962 | A1 * | 1/2009 | Ives et al. ..................... 715/716 |
| 2009/0313265 | A1 | 12/2009 | Sifry |
| 2010/0313215 | A1 | 12/2010 | McCoskey et al. |
| 2011/0015968 | A1 | 1/2011 | Carlson |
| 2012/0036041 | A1 | 2/2012 | Hesselink |
| 2012/0278473 | A1 | 11/2012 | Griffiths |
| 2013/0212401 | A1 | 8/2013 | Lin |
| 2013/0266137 | A1 | 10/2013 | Blankenbeckler et al. |
| 2013/0268749 | A1 | 10/2013 | Blankenbeckler et al. |
| 2013/0268759 | A1 | 10/2013 | Blankenbeckler et al. |
| 2013/0268771 | A1 | 10/2013 | Blankenbeckler et al. |
| 2014/0095439 | A1 | 4/2014 | Ram |
| 2014/0105508 | A1 * | 4/2014 | Arora ........................... 382/218 |
| 2014/0169921 | A1 | 6/2014 | Carey |
| 2014/0173215 | A1 | 6/2014 | Lin et al. |

OTHER PUBLICATIONS

Liu, Likun, et al., "SmartScan: Efficient Metadata Crawl for Storage Management Metadata Querying in Large File Systems", CMU-PDL-10-112, Parallel Data Laboratory, Carnegie Melon Univ., Pittsburgh, PA, Oct. 2010, 19 pages.*
Niblack, Wayne, et al., "Web-Based Searching and Browsing of Multimedia Data", ICME 2000, New York, NY, Jul. 30-Aug. 2, 2000, pp. 1717-1720.*
Nagao, Katashi, "Semantic Annotation and Transcoding: making Text and Multimedia Contents More Usable on the Web", IEEE Multimedia, vol. 8, No. 2, © 2001, 14 pages.*
Hsieh, Jonathan M., et al., "The Architecture and Implementation of an Extensible Web Crawler", NDSI '10, San Jose, CA, Article No. 22, USENIX Ass'n, 15 pages.*
Karapantelakis, Athanasios, et al., "Utilizing Social Context for Providing Services to Mobile Users", EuroSSC 2010, LNCS 6446, Springer-Verlag, Berlin, Germany, © 2010, pp. 28-41.*
McLearn, Gregory Louis, "Autonomous Cooperating Web Crawlers", Master's thesis, Univ. of Waterloo, Ontario, Canada, © 2002, 105 pages.*
The Microsoft Computer Dictionary, 5th Edition, Microsoft Press, Redmond, WA, © 2002, p. 558.*
Notification fo Trans. of the International Search Report and the Written Opinion of the Int'l Searcing Authority dated Jun. 27, 2014 for related PCT Application No. PCT/US2014/029774, pp. 1-10.
Office Action dated Jan. 5, 2015 from U.S. Appl. No. 13/836,686, 13 pages.

* cited by examiner

SHARED MEDIA CRAWLER DATABASE METHOD AND SYSTEM

CROSS-REFERENCE TO RELATED APPLICATIONS

The present application is related to U.S. patent application Ser. No. 13/836,686, filed on Mar. 15, 2013, entitled "FILE SYSTEM NOTIFIER FOR FILES SHARED AMONG STORAGE DEVICES"which is herein incorporated by reference in its entirety.

BACKGROUND

Today, files comprise content as well as metadata. The metadata provides additional information about the file, such as its format, date and time, etc. Frequently, this metadata can be used by client applications to provide various functions.

Currently, storage devices face several challenges regarding media access programs. Among these are the CPU, memory, and disk usage expenses of the various "crawlers" and the mechanisms for notifying media-related applications (just "applications" hereafter) about changes to the media file population of the disks. "Crawlers" are programs that scan file systems and provide data about the media file population. They may be standalone, or parts (threads, perhaps) of an application.

However, in the known devices and systems, each user computer and client application creates its own proprietary metadata database for the files it accesses. This is inefficient and subject to duplication, errors, etc.

BRIEF DESCRIPTION OF THE DRAWINGS

Systems and methods which embody the various features of the invention will now be described with reference to the following drawings, in which.

DETAILED DESCRIPTION

The embodiments relate to transcoding, cataloging, and/or extracting metadata about files stored in a storage device. The embodiments may be implemented on any platform running various operating systems, such as Windows, LINUX, Mac OSX, etc. In one embodiment, a crawler runs on the storage device and maintains a catalog that is stored in the volume with the data that has been cataloged by the crawler. The crawler may discover files of any type and extract associated metadata about the files. The metadata discovered by the crawler may include, for example, the volume, data and time of last access, image thumbnails, transcoding information, and the like. In addition, as noted, the crawler may assist or perform file transcoding. Furthermore, the crawler may notify other entities of its progress and/or status.

In one embodiment, the crawler may be responsive to file system events that indicate changes to the file system, such as additions, deletions, or other types of changes. In addition, the crawler may synchronize the database with the file system so that they indicated the same state for a particular file. The crawler can create a metadata database on the storage device that can be referenced and interfaced with a standard API by any requesting device or client. The crawler can also automatically update the metadata as the file is updated, etc.

Certain embodiments of the inventions will now be described. These embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. To illustrate some of the embodiments, reference will now be made to the figures.

Figure 1:
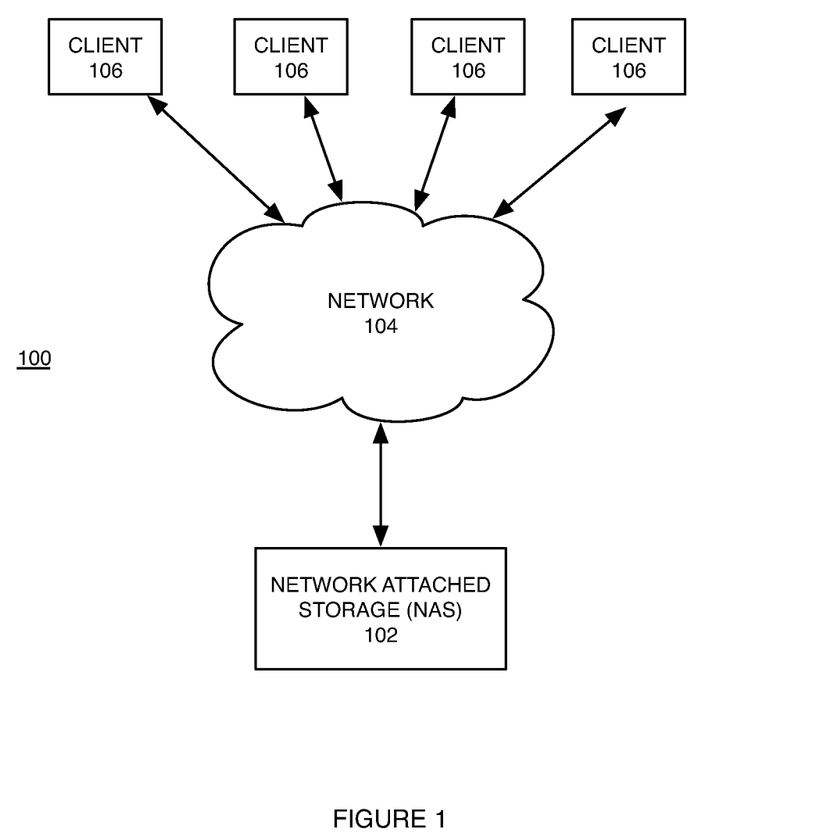
FIG. 1 shows an exemplary system of an embodiment of the present invention.

FIG. 1 shows an exemplary system of an embodiment of the present invention. The embodiments of the present invention may be implemented on any type of storage device or device that provides file notification services. For purposes of illustration, an exemplary system 100 is shown with a network attached storage (NAS) 102. The NAS 102 is coupled to a network 104 and one or more clients 106. These components will now be briefly described below.

The NAS 102 is file-level storage device that is capable of connecting to a network, such as network 104 and provides access to files stored in its storage medium as a file server. In one embodiment, NAS 102 is implemented with known hardware, software, and firmware. For example, in one embodiment, the NAS 102 is configured as an appliance having an embedded operating system. The NAS 102 may support a variety of operating systems, such as UNIX, LINUX, Windows, and the like. As will be further described, the NAS 102 may also comprise multiple storage mediums, such as one or more hard disks that are arranged into a RAID. Furthermore, the NAS 102 may support various protocols, such as NFS, SMB/CIFS, AFP, etc.

Alternatively, in other embodiments, the system 100 may comprise direct attached storage devices or external drives. For example, the system 100 may comprise one or more external drives, such as the MyBook or Passport provided by Western Digital Technologies, Inc.

Network 104 provides a communication infrastructure for data communications between the components of system 100. Network 104 may comprise known network elements, such as hubs, switches, routers, firewalls, etc., to facilitate and secure these communications. In the embodiments, the network 104 may comprise a local area network, a wide area network, etc. In addition, the network 104 may comprise wired and wireless links or components to carry its communications.

Clients 106 represent the various client devices that may store and/or access files on the NAS 102. For example, the clients 106 may be a desktop, a laptop, a tablet, a smart phone, etc. The embodiments support any device that can access a file stored on the NAS 102.

In one embodiment, clients 106 may run various applications subscribing to the notification services of the embodiments. In the prior art, applications that were LINUX compatible made use of the known "inotify" service for file notifications. In one embodiment, one or more applications of clients 106 may be modified to read a specified file data pipe and parse the XML message format for file notification purposes. In some embodiments, each application may have the flexibility of keeping its own database and schema. In other embodiments, the databases of the client applications may be combined.

For applications that modify meta-data, they may be configured to do so at the file level. In response, the notification system may automatically pick up the changes and write the changes to an appropriate data pipe. Other applications may then read the change, and update their respective databases. The notification system and its related components are further described with reference to FIG. 3.

Figure 2:
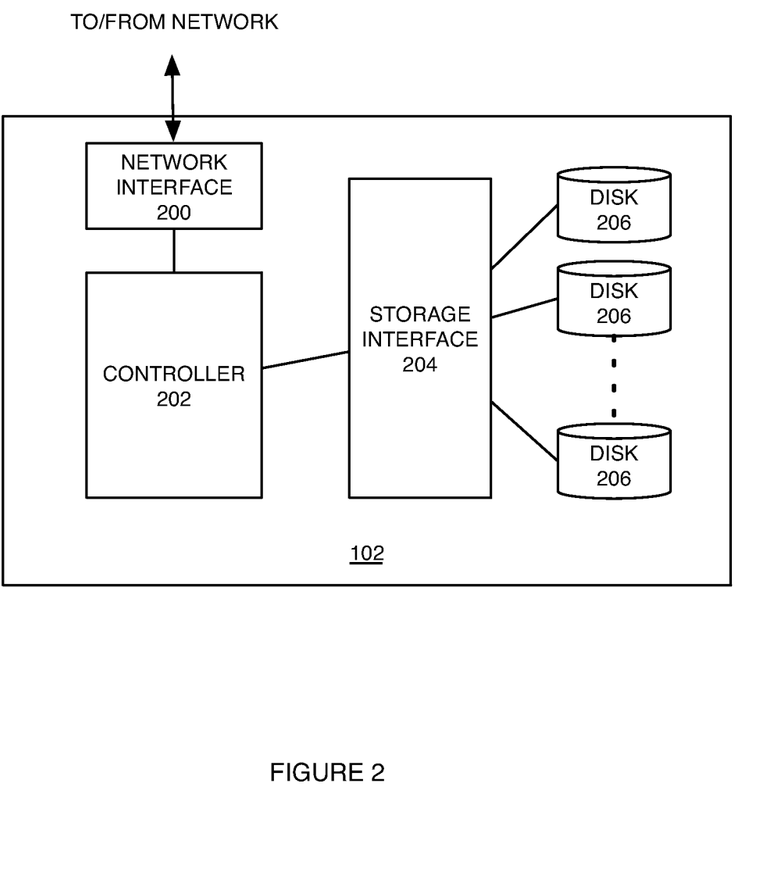
FIG. 2 shows an exemplary network attached storage in accordance with an embodiment of the present invention.

FIG. 2 shows an exemplary block diagram of a network attached storage (NAS) 102 with a RAID in accordance with an embodiment of the present invention. As shown, the NAS 102 may comprise a network interface 200, a controller 202, a storage interface 204, and a storage array of disks 206. These components will now be briefly described below.

Network interface 200 serves as the network communications interface for the NAS 102. For example, in one embodiment, the network interface 200 may comprise one or more Gigabit Ethernet, Ethernet, USB, Wi-Fi, and/or interfaces for communications with network 104. Such components are known to those skilled in the art.

Controller 202 represents the hardware and software that manages the disks 206 of the NAS 102 and presents them as a logical unit or volume to the clients 106. In some embodiments, the controller 202 may also comprise one or more other components to supplement its operations, such as an on-chip RAID controller, a memory or disk cache, etc.

Storage interface 204 serves as an interface between the controller 202 and the disks 206. The storage interface 204 may support various communications, such as SAS, SATA, SCSI, etc.

Disks 206 represent the storage medium and associated electronics for the devices storing data for the NAS 102. In one embodiment, the disks 206 may be implemented as hard disk drives, such as those provided by Western Digital Technologies, Inc. Of course, in other embodiments, the NAS 102 may comprise other types of storage media and devices, such as solid-state drives, hybrid drives, etc. Any type of storage drive that can be configured as part of a RAID may be implemented as part of an embodiment of the present invention. In addition, the embodiments of the present invention are applicable to other platforms and types of storage devices. For example, the embodiments may be employed on direct attached storage devices, portable drives, etc.

Figure 3:
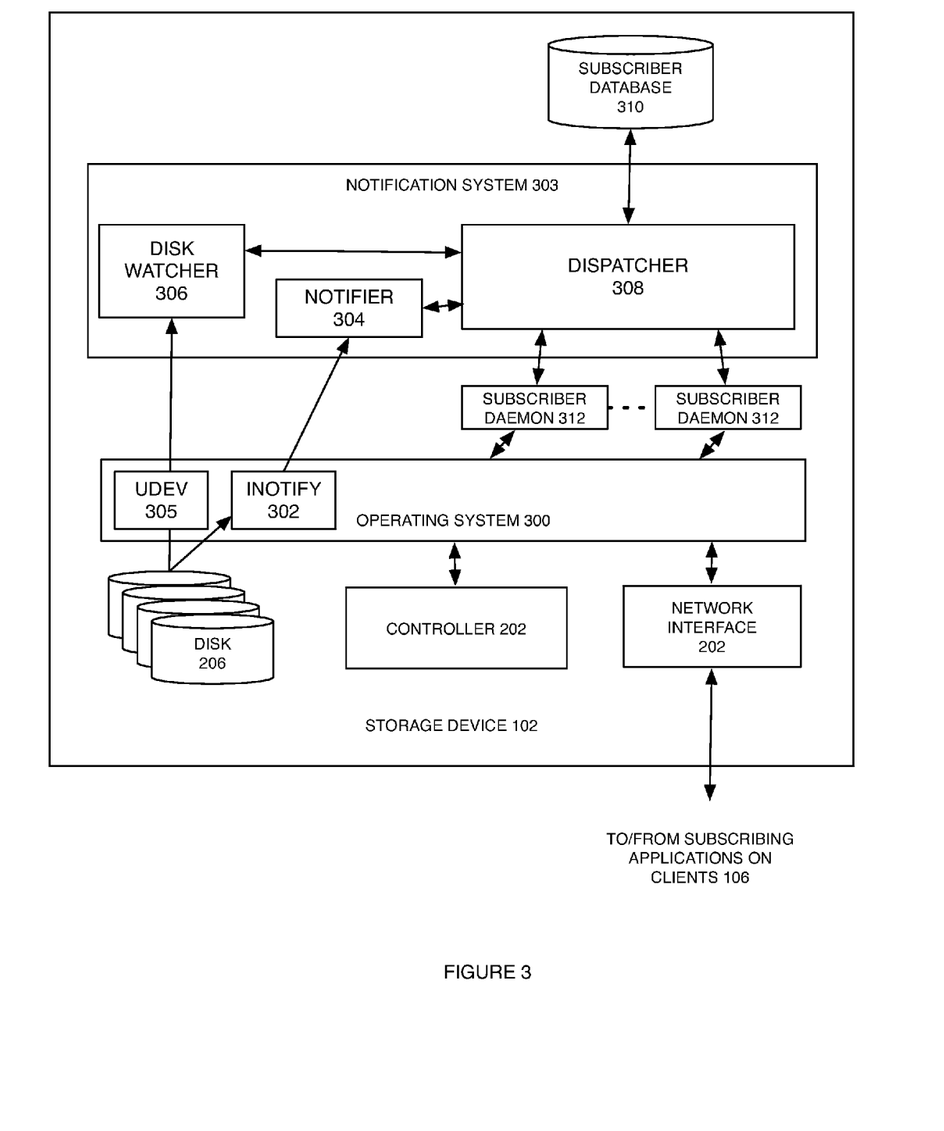
FIG. 3 shows an exemplary architecture for a file notification mechanism in accordance with an embodiment of the present invention.

FIG. 3 illustrates a block diagram of an architecture for a notification system in accordance with an embodiment of the present invention. As shown, the notification system may run on an operating system 300. For purposes of illustration, the notification system of one embodiment for storage device 102 is shown running on the LINUX operating system. Accordingly, FIG. 3 refers to the known inotify notification service of LINUX as inotify 302. This service provides various events indicating file system changes that are requested. Those skilled in the art will recognize that other embodiments may be implemented for other types of storage devices and different operating systems, such as UNIX, Windows, Mac OSX, and the like.

In one embodiment, an application framework (not shown) may be installed and running on top of the operating system 300. The application framework may provide a set of standard interfaces, for example, for the notification system and other applications running on the storage device 102.

As shown, a notification system 303 may comprise a notifier 304, a disk watcher 306, a dispatcher 308, and a subscription database 310. These components and their operation will now be described below. In general, the embodiments provide a notification mechanism or system that is extensible and provide file level, disk level, and volume level notification services to any application subscribing to its services. In one embodiment, the notification system 303 and its components employ named data pipes in order pass information. The use of named data pipes is believed to provide a faster communication mechanism for the notification system 303. Alternatively, in other embodiments, the notification system 303 may employ other communication mechanisms, such as sockets or inter-process communications.

Notifier 304

In one embodiment, the notifier 304 runs as daemon on the storage device 102 and consolidates the file notification tasks by the client applications running on clients 106. The notifier 304 then interfaces the inotify service 302 of the operating system 300 as the only requester. This structure ensures that the notifier 304 is more resilient and can accommodate a higher number of subscribers than the conventional techniques that rely purely on the operating system services, such as inotify.

In one embodiment, the notifier 304 is a user-space program that handles notification for all media. Similar to other LINUX services, the notifier 304 is started and stopped through a script. The start/stop script for notifier 304 may be called with the "start" parameter during system startup due to a symlink whose contents are called once during startup. When the script is called with the "start", it will also start the dispatcher 308 binary and proceeds to run as a daemon until termination. When the script is called with the "stop" parameter, it will send a SITERM signal to the notifier 304 and the notifier 304 will exit out all the listening and writing threads.

The notifier 304 may have a collection of configuration files stored in the subscription database 310, such as "/etc/notify.d" for applications that wish to receive notification and a default file "/etc/notify.d". In addition, the notifier 304 may support dynamic update of the configuration by re-parsing the configuration files. In one embodiment, the notifier 304 determines the path(s) of interest for targeted files listed in the configuration file. In addition, the notifier 304 may be configured to interpret wild-card pattern for disks that may be mounted.

The notifier 304 coordinates with applications running on clients 106 to specify their respective configuration files and the path to a named pipe on which notification messages are passed.

In one embodiment, the notifier 304 passes messages in the form of extensible markup language (XML) text, specifying the affected file path, the type of change (add, delete, modify), and any metadata available within the file, such as ID3 tags. The notifier 304 may employ other types of message formats, such as hypertext markup language messages (HTML), standard generalized markup language, and the like.

Below is an example of an XML template for a message used by the notifier 304.

```
<?xml version="1.0"?>
<file_data version="1.0">
  <id>{Message identifier}</id>
  <source>{Message source process name}</source>
  <base_path>{base mount path}</base_path>
  <file>
      <path>{File path, relative to base_path}</path>
      <previous_path>{previous path, full path}</previous_path>
  </file>
  ...
</file_data>
\0000 (32-bit NULL as delimiter between messages)
```

In one embodiment, the notifier 304 reuses the pipe reading and writing classes from the dispatcher 308 and integrates with its own set of components. When starting up, the notifier 304 traverses through the list of removable drives mount point and places inotify watchers on every sub-directory of every mount point. The notifier 304 also creates a reader thread to receive any mount add/removal event to remove and add watchers accordingly to inotify 302. The notifier 304 may also listen on all the watcher events from inotify 302 and send respective XML messages to the dispatcher 308 as events occur.

Disk Watcher 306

The disk watcher 306 may be a program or shell script that notifies registered applications of disk changes on storage device 102 or other part of system 100. For example, in one embodiment, the disk watcher 306 is configured to subscribe to services of the known "udev" service (labeled as udev 305) provided by the LINUX operating system 300. In FIG. 3, the disk watcher 306 is shown as a separate program. However, those skilled in the art will recognize that disk watcher 306 and notifier 304 may be combined in whole or in part to perform the same functions.

In similar fashion to notifier 304, the disk watcher 306 may establish a uniquely-named pipe, such as "/var/local/diskchange", with applications running on clients 106. In one embodiment, the disk watcher 306 is implemented as a shell script running on udev of the operating system 300. Thus, when udev is notified that a disk has been added or removed, the disk watcher 306 sends an XML-formatted message through the pipe specifying the change to the clients 106. The applications on clients 106 can then take appropriate action to deal with the change, such as invalidating database entries when a disk is removed.

As media files are moved, renamed, accessed, and deleted, the inotify/unotify alerts the notifier 304. The notifier 304, in turn, sends a file data XML message to the dispatcher 308. The dispatcher 308 then routes the various messages to the applications on clients 106.

Dispatcher 308

As noted above, the dispatcher 308 receives and consolidates the XML messages from notifier 304 or disk watcher 306, checks its subscription list in subscription database 310 for subscribing applications with specified rules matching with the XML message, and then sends the XML messages to the appropriate subscribing applications on clients 106. As shown in FIG. 3, in one embodiment, the dispatcher 308 forwards the messages to corresponding daemon processes 312 that handle the communications with the entities outside of the storage device. The daemon processes 312 that are to receive the messages may be identified in the configuration file stored within the subscription database 310. The daemon processes are further described below.

Dispatcher 308 may forward XML messages to the subscribing application on clients 106 based on a matching rule via its specified incoming named pipe in subscription database 310. For example, for a file move event, the previous path field may indicate the full path as it is possible to move files/directories across different mount points. Dispatcher 308 may run as a separate program on operating system 300 or as a component of notifier 304.

Subscription Database 310

Subscription database 310 serves as a database indicating the subscribing applications of clients 106 requesting services of the notifier 304 and disk watcher 306. In addition, the subscription database 310 comprises records indicating the data pipes by which the notifier and disk watcher 306 communicate. Furthermore, the subscription database 310 may contain information about all the watchers as well as the absolute path on the file system of operating system 300. In one embodiment, the subscribers of the notification system 303 indicate the various parameters of the subscription in a configuration file stored in the subscription database 310.

Subscriber daemons 312 indicate the daemon processes established by the subscribers of the notification system 303. For example, clients 106 may establish one or more of daemon processes 312 to receive the file notification messages from the notification system 303. During operation, the dispatcher 308 will forward file system events, e.g., from the notifier 304 or disk watcher 306 to the appropriate daemon process 312. The daemon process 312 then coordinates with the operating system 300 and forwards the file notification message to its destination, for example, via the network interface 200.

The subscriber daemons 312 may be established for a variety of types of subscribers. For example, a media crawler may also establish a daemon 312 in order to communicate with the notification system 303. As another example, a web services daemon process may be instantiated to enable remote communications with the file notification system 303.

Figure 4:
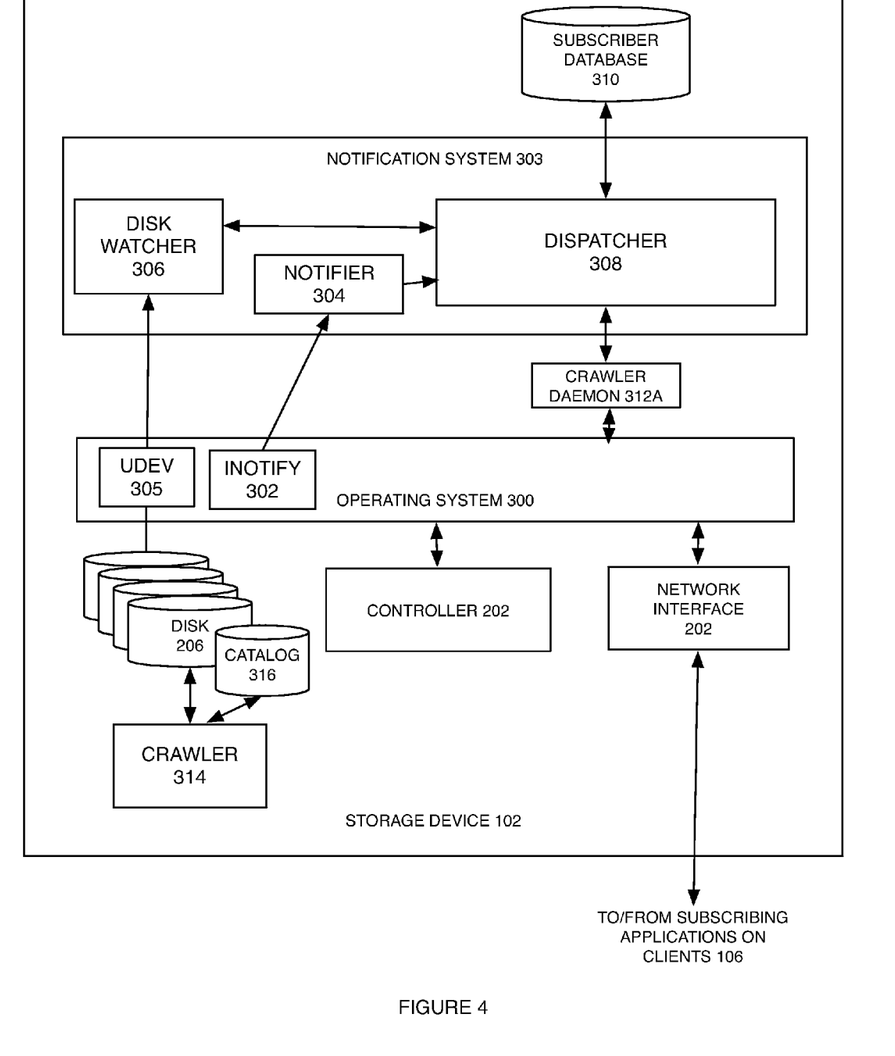
FIG. 4 illustrates an exemplary storage device comprising a crawler that transcodes, catalogs, and/or extracts metadata about files stored on the storage device.

FIG. 4 illustrates an exemplary storage device comprising a crawler that transcodes, catalogs, and extracts metadata about files stored on the storage device. As shown, the storage device 102 may comprise a crawler 314 that assists in transcoding, cataloging, and extracting metadata about files stored on the storage device 102 in storage media of disks 206. These components and their operation will now be described below.

Crawler 314

In general, the crawler 314 may perform an initial scan of any new media added to the storage device 102, perform meta-data scanning and extracting, and perform transcoding/thumbnailing of files stored on the storage device 102. In one embodiment, the crawler 314 is a single program for the entire NAS 102, which may run per-disk threads or instances. For example, for media files, the crawler 314 may perform a meta-data scan of the file, such for album-art extraction, user interaction data, etc.

The crawler 314 will scan disks 206 initially and then rely on the notification services of the notification system 303 for changes to mounted file systems. In addition, the crawler 312 will scan a new disk when notified by disk watcher 308.

During operation after its initial scan, the crawler 314, may register for file system notifications with the operating system. In one embodiment, the crawler 314 subscribes to the services of notification system 303, for example, by writing a configuration file to the subscription database 310. In addition, the crawler 314 may establish a daemon process 312A to receive messages from the notification system 303. The crawler 314 may provide various notifications to other entities, such as clients 106, via the daemon process 312A and the dispatcher 308. The crawler 314 may also discover files of any type and extract associated metadata about the files automatically during a scan or at the request of a client/use.

The crawler 314 may be configured to send messages to a named pipe that is read by the notifier 304 for every media file (or every file) encountered during the crawl, but not for those identified by the notifier 304. In one embodiment, the path to the pipe for crawler 314 is a command line option, in a configuration file read by crawler 312 and notifier 304 in control script. Of note, the use of named pipes allows for some debug capability, in that the crawler 314 output can be fed directly to an application by having the application read from the pipe that would have been used by the notifier 304. For example, LINUX allows hard links to named pipes on the same file system, so the crawler 314 may be writing to "/var/local/notifyd" while the application is reading from "/usr/local/lib/application-pipe".

In one embodiment, the crawler 314 produces XML messages in similar fashion to notifier 304. Notifier 304 may then re-distribute those messages via dispatcher 308 according to the rules provided by registered applications indicated in subscription database 310. Crawler 314 may ensure that its messages are serialized to the notifier 304

The crawler 314 may store its information in a catalog database 316, which is stored with the volume in disks 206 that has been crawled by the crawler 314. This permits the data retrieved by crawler 314 to accompany the data. The information contained in the catalog database 316 may include, among other things, transcoding information, extracted metadata, such as thumbnail images, etc., play counts, file locations, and the like.

In addition, the crawler 312 may be configured to synchronize the state of a file in the catalog database 316 with its corresponding state in the file system. For example, after its initial scan, the crawler 312 may leverage the functionality of file notification events provided by the notification system 303. As noted, in one embodiment, the crawler 314 instantiates a crawler daemon process 312A that receives updates to the file system from the notification system 303. In response, the crawler daemon process 312A forwards the files system event information to the crawler 314. In one embodiment, the crawler daemon process 312A employs a named data pipe. In other embodiments, the crawler daemon process 312A employs an inter-process communication thread.

Figure 5:
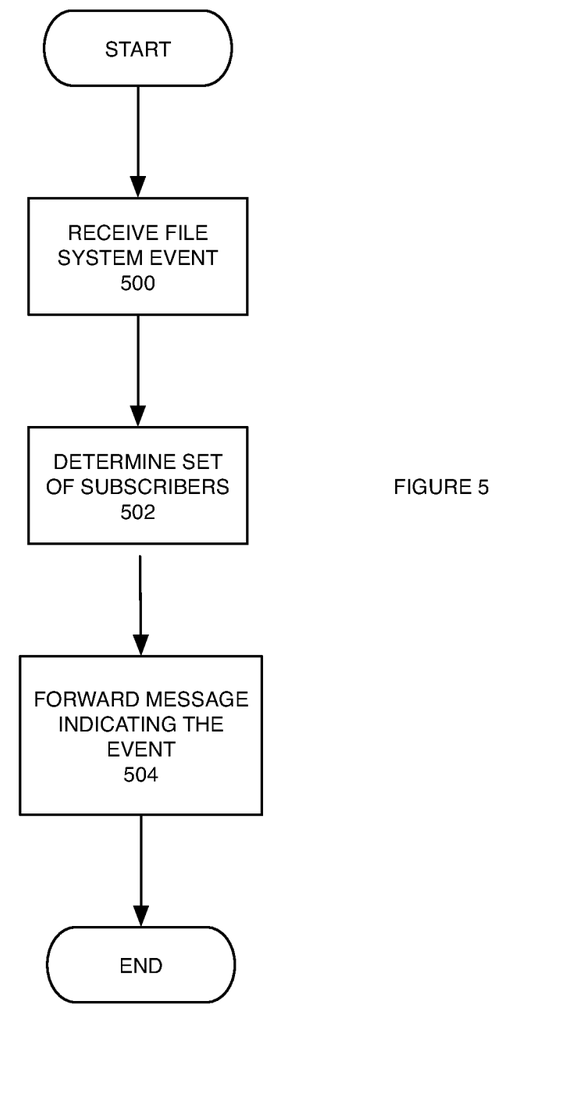
FIG. 5 illustrates an exemplary process flow for providing notifications for file system events.

FIG. 5 illustrates an exemplary process flow for providing notifications for file system events. In stage 500, the notifier 304 receives a file system event. For example, in one embodiment, the notifier 304 is configured to establish a watch with the inotify 302 service of the operating system 300. The notifier 304 may then generate and forward a message to the dispatcher 308 with the information regarding the file system event.

In stage 304, the dispatcher 308 determines the set of subscribers that are to receive a notification about the file system event. For example, in one embodiment, the dispatcher 308 may perform a filtering search for matches in the subscriber database 310 for entities, such as clients 106, which match the criteria for receiving the notification message. As noted above, the clients 106 may declare the criteria for notifications that they are to receive based on writing to a configuration file in the subscription database 310. In one embodiment, the notification is formatted as an XML message, which is forwarded by the dispatcher 308.

In stage 504, the dispatcher 308 forwards the message to its intended destinations. For example, in one embodiment, the dispatcher 308 forwards the message about the file system event to respective subscriber daemons 312 running on the storage device 102. Subsequently, the daemons 312 generate and send the message, for example, via the network interface 202 to the clients 106.

Figure 6:
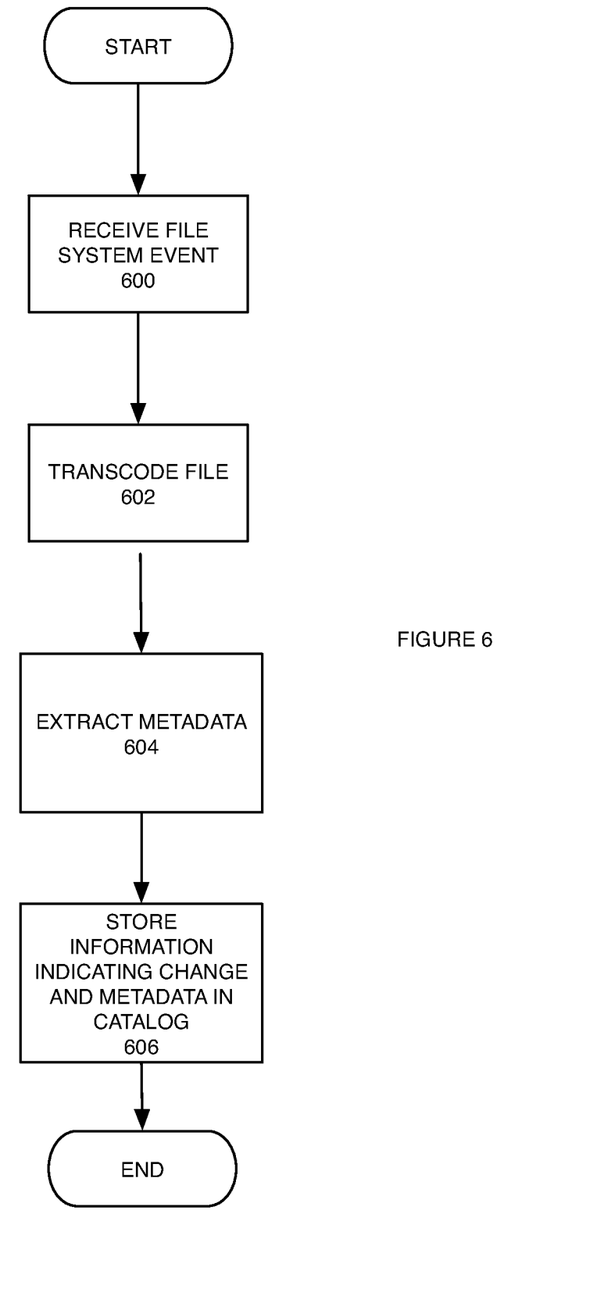
FIG. 6 illustrates an exemplary process flow for maintaining a catalog consistent with a file system.

FIG. 6 illustrates an exemplary process flow for maintaining a catalog consistent with a file system. In stage 600, the notifier 304 receives a file system event. For example, in one embodiment, the notifier 304 is configured to establish a watch with the inotify 302 service of the operating system 300. The notifier 304 may then generate and forward a message to the dispatcher 308 with the information regarding the file system event. The dispatcher 308 determines the set of subscribers that are to receive a notification about the file system event. For example, in one embodiment, the dispatcher 308 may perform a filtering search for matches in the subscriber database 310 for entities, such as clients 106, which match the criteria for receiving the notification message. As noted above, the clients 106 may declare the criteria for notifications that they are to receive based on writing to a configuration file in the subscription database 310.

In one embodiment, the notification is formatted as an XML message, which is forwarded by the dispatcher 308. In one embodiment, after its initial scan of the disks 206 or other media, the crawler 314 subscribes to the notification system 303 in order to receive various file system events. As such, the crawler 312 may establish a crawler daemon process 312A, which is in communications with the dispatcher 308, for example, via a named data pipe.

In stage 602, the crawler 314 transcodes the file regarding the file system event. The crawler 602 may perform transcoding from any known format to any other known format.

In stage 604, the crawler 314 extracts metadata about the file. For example, the crawler 314 may perform a meta-data scan of the file, such for album-art extraction, user interaction data, etc. The crawler 314 may also extract metadata about client interaction with various files, such as edits, play counts, etc. Furthermore, the crawler may discover files of any type and extract associated metadata about the files automatically during a scan or at the request of a client 106.

In stage 606, the crawler 314 then stores information about the change to the file and the extracted metadata in its catalog 316. Thus, with this mechanism, the crawler 314 may synchronize the state of a file in the catalog database 316 with its corresponding state in the file system by monitoring the file system events reported by the notification system 303. Furthermore, the crawler 314 may send notifications regarding such changes to a file or changes to the catalog 316. For example, in one embodiment, the crawler 314 may write to a named pipe that is read by the notifier 304. In turn, this may prompt the notifier 304 to generate and forward a message that is routed by the dispatcher 308. The dispatcher 308 then determines the next destination of this message from the crawler 314, for example, based on a filtering match from subscriber database 310 and forwarding the message to one or more of the daemon processes 312.

The features and attributes of the specific embodiments disclosed above may be combined in different ways to form additional embodiments, all of which fall within the scope of the present disclosure. Although the present disclosure provides certain embodiments and applications, other embodiments that are apparent to those of ordinary skill in the art, including embodiments, which do not provide all of the features and advantages set forth herein, are also within the scope of this disclosure. Accordingly, the scope of the present disclosure is intended to be defined only by reference to the appended claims.

What is claimed is:

1. A method of monitoring files stored in a volume comprising at least one storage device, comprising:
    monitoring, by a crawler, the at least one storage device;
    maintaining, by the crawler, a catalog for files stored within the volume;
    receiving, by the crawler, an event indicating a change to a file stored on the at least one storage device;
    transcoding, by the crawler, the file from a first format to a second format;
    extracting, by the crawler, metadata for the file;
    storing, by the crawler in the volume, information indicating the change and the transcoding in the catalog of the files;
    determining a set of subscribers that have requested to receive a notification of the event;
    retrieving notification criteria for the set of subscribers from the catalog of files;

evaluating the retrieved notification criteria for each of the set of subscribers; and sending a notification of the event to those subscribers whose notification criteria are satisfied.

2. The method of claim 1, wherein the catalog is specific to each volume provided by the storage device.

3. The method of claim 1, wherein the catalog accompanies the files stored on the storage device.

4. The method of claim 1, further comprising determining, by the crawler, a thumbnail indicating contents for each file.

5. The method of claim 1, further comprising transcoding, by the crawler, a format of a file serviced from the storage device.

6. The method of claim 1, wherein logging, by the crawler, changes to the files stored on the storage device comprises subscribing to a file notification service provided by an application framework running on the storage device.

7. The method of claim 1, further comprising:
providing an interface to the catalog of files stored in the storage device;
receiving a request for information for a file indicated in a presented view; and
retrieving, by the crawler, the requested information about the file.

8. The method of claim 7, further comprising providing, from the crawler, a notification indicating the information about the requested file.

9. The method of claim 1, further comprising:
receiving a notification that a new storage media has been added to a volume of the storage device; and
scanning, by the crawler, the new storage media.

10. The method of claim 1, further comprising sending, by the crawler, messages indicating changes to the files stored on the at least one storage device via a named pipe.

11. The method of claim 1, wherein logging changes to the files stored on the at least one storage device comprises receiving updates from a file notification service running as a user space application on the storage device.

12. The method of claim 11, wherein receiving updates from the file notification service comprises receiving file notification messages from a notification service running within an application framework installed on the at least one storage device.

13. The method of claim 11, wherein receiving updates from the file notification service comprises receiving file notification messages from an operating system service running on the at least one storage device.

14. A storage device comprising:
at least one volume of storage for storing files;
at least one storage medium providing one or more volumes of storage for a plurality of files; and
a controller, configured by executable program code, to execute an operating system, and a crawler application, the crawler application being configured to crawl the at least one storage medium responsive to a change in at least one of the volumes, to determine files stored in the at least one volume and metadata for each of the files, and to generate a catalog for the files stored in the at least one volume that indicates changes to the metadata and changes to the files; and
a dispatcher configured to provide information about content of the files stored in the at least one volume, the dispatcher being configured to determine a set of subscribers that have requested to receive a notification of an event, retrieve notification criteria for the set of subscribers from the catalog of files, evaluate the retrieved notification criteria for each of the set of subscribers; and cause a notification of the event to be sent to those subscribers whose notification criteria are satisfied.

15. The storage device of claim 14, wherein the at least one storage medium comprises a plurality of disks configured as a redundant array of independent disks.

16. The storage device of claim 14, wherein the controller is configured to execute a Linux operating system.

17. The storage device of claim 16, wherein the controller is configured to execute an application framework running on the Linux operating system.

18. The storage device of claim 14, wherein the controller is configured to provide access to the catalog via an application programming interface.

19. The storage device of claim 14, wherein the controller is configured to provide access to the catalog.

20. The storage device of claim 14, wherein the crawler is configured to receive notification of changes to the files stored in the at least one volume from a notification service.

21. The storage device of claim 14, wherein the crawler is configured to determine changes to at least one of the volumes from an event provided from a disk watcher running on the storage device.

* * * * *